June 5, 1973 M. M. EPSTEIN ET AL 3,737,355
FASTENER IMPROVEMENT
Original Filed Feb. 23, 1966
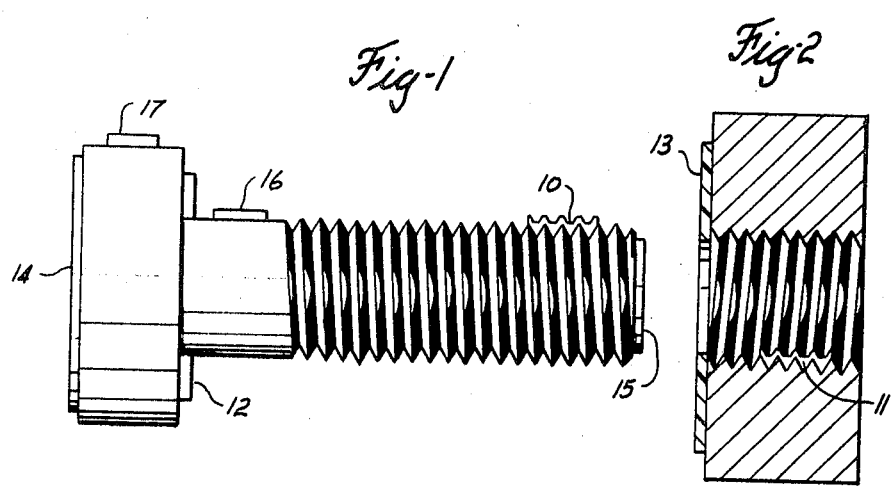
INVENTOR.
Michael M. Epstein
Charles W. Cooper.
ATTORNEYS.

3,737,355
FASTENER IMPROVEMENT
Michael M. Epstein and Charles W. Cooper, Columbus, Ohio, assignors to Standard Pressed Steel Co., Jenkintown, Pa.
Application Feb. 23, 1966, Ser. No. 524,631, which is a continuation-in-part of application Ser. No. 437,283, Mar. 4, 1965, both now abandoned. Divided and this application Jan. 18, 1971, Ser. No. 107,402
Int. Cl. B32b 15/08, 27/34, 27/38
U.S. Cl. 156—293                                       10 Claims

ABSTRACT OF THE DISCLOSURE

Method for providing a metal fastener, such as a threaded nut or bolt, with a locking element made of an engineering plastic such as nylon, by preparing a laminate of said plastic and an uncured adhesive blend of a thermoplastic and thermosetting resin, dimensioning the laminate to the size and shape of the desired locking element, applying the formed laminate to the fastener with the adhesive layer in contact therewith, and applying heat and pressure to adhere the laminate-locking element to the fastener.

---

This application is a division of application Ser. No. 524,631 filed Feb. 23, 1966, now abandoned, which latter application is, in turn, a continuation-in-part of application Ser. No. 437,283 filed Mar. 4, 1965, now abandoned.

The present application relates to a method for providing a metal fastener with a plastic looking element.

The present invention is a metal fastening device having a plastic element bonded to a bearing surface thereof or to a surface that is to be engaged by a mating fastening device or by a workpiece, the fastener being characterized in that the plastic element is an engineering thermoplastic material (defined more fully hereinafter) and is bonded to the metal by a structural adhesive film comprising a cured blend of a thermosetting resin and a thermoplastic resin that can crosslink with the thermosetting resin during the curing.

There are many instances where it is desirable to tightly bond a plastic element to a surface of fastener. For example, as disclosed in Joseph P. Villo's United States Patent 3,093,177, useful thread locks can be made by fusing nylon and bonding it directly to the threads of an externally or internally threaded fastener. Highly useful fasteners can also be made by bonding the plastic to fastener surfaces other than the threaded portions. Thus, plastic, when applied to either the crown of a bolt head or to the tip of a bolt or set screw, will serve to prevent scoring or marring the part against which the crown or tip bears. Facing the bearing surfaces of nuts and bolt heads will serve to minimize marring the workpiece and can also be employed to form a sealed joint. When applied to the unthreaded shank of a bolt or to the body of a metal drift or dowel pin it will serve to compensate for oversize or out of round bores.

In the accompanying drawings FIG. 1 illustrates a bolt and FIG. 2 illustrates a nut. The portions of fastener to which plastic elements are to be bonded in accordance with invention include any of the following surfaces: the bolt threads 10, the nut threads 11, the bolt head bearing face 12, the nut bearing face 13, the bolt crown 14, the bolt tip 15, the bolt shank 16, and the head side wall 17.

When the plastic element is bonded to the fastener threads to form thread locks in the manner of the Villo patent, the plastic is applied only to localized areas (both axially and circumferentially) of the threads. In such cases the plastic is bonded to the root, flanks and crest of the thread.

Generally speaking, the selection of suitable plastics for bonding to the fastener will necessitate a balancing of the physical and chemical properties of the plastic with the end use requirements. In most instances, the end use is such that the device will be subjected to a complex combination of forces but primarily to compressive and shearing forces. Therefore the plastic must be one that will react favorably to such forces. Other desirable properties include a high degree of toughness, resistance to creep under load, hardness, resilience, and elastic recovery. In addition, the plastic should be chemically resistant to any environment that might be encountered in the use of the product.

The linear thermoplastic nylons that can be used for injection molding or extrusion molding operations (for example, the nylon resins sold by E. I. du Pont de Nemours & Co., under the ZYTEL trademark) are from a physical and chemical property standpoint well suited for the purposes of this invention. So too are the well known engineering equivalents of such nylons, for example, the polycarbonates, polyacetals, acrylonitrile-butadiene styrene, polyimides, polyvinyl chloride, phenoxies, polyphenylene oxide, polysulfone, and the like. Such materials can be substituted for nylon and employed in those cases where their particular viscoelastic characteristics are appropriate for the end use. Hereinafter these plastics and nylon will be collectively referred to as "engineering thermoplastics," i.e., rigid, load bearing materials that substantially follow Hook's law.

Unfortunately, the engineering thermoplastics cannot be directly bonded to metal surfaces with sufficient strength to withstand the peculiar combination of forces that act on loaded fastener systems.

In some instances, the engineering thermoplastics can be satisfactorily affixed to certain metals if the surface is given special chemical or physical pretreatments to make a highly porous surface. However, such operations are expensive and impractical. Chemical pretreatments often give rise to problems (such as corrosion fatigue) that make such operations undesirable.

We have found that the engineering thermoplastics can be bonded to fastener surfaces without pretreatments other than cleaning and degreasing by means of certain structural adhesive films, i.e., films formed of a blend of an uncured thermosetting resin and a thermoplastic resin that can cross link with the thermosetting resin during the curing of the thermosettable component. Particularly suitable structural adhesive films are the blended nylon-epoxy films that will be described in greater detail hereinafter.

In the preferred practice of the invention the engineering plastic and the structural adhesive film are first formed into a plastic laminate but without curing the thermosetting resin component of the film. The laminate is then positioned on the surface of the fastener so that the blended film layer is interposed between the fastener surface and the engineering thermoplastic. The laminate is then heated to a temperature above the melting point of the engineering thermoplastic and sufficient pressure is applied to cause the laminate to flow into intimate contact with the surface on which it has been positioned. Thereafter, the flowed laminate is held at a temperature below the melting point of the engineering thermoplastic for a sufficient time to cure the adhesive film and bond the plastic cement to the fastener.

A preferred plastic laminate for use in this invention is formed by bonding a layer of nylon to a layer of a blend of nylon and an uncured epoxy resin. Such laminates can be bonded to metallic substrates. In many instances, they can be bonded directly and without special surface preparation to substrates such as carbon steel, stainless steel, oxide coated steel or cadmium plated steel. Nylon alone cannot be bonded directly to such substrates with a satisfactory bond strength to withstand the complex forces to which loaded fasteners are subjected. Blends of nylon and epoxy resins can be bonded to metal substrates with highly satisfactory bond strength but because the water sensitivity for the nylon-epoxy blend is greater than that of either nylon or epoxy alone, laminates of the blended nylon-epoxy resin are not always suitable for use in high moisture environments. Under high moisture conditions, nylon-epoxy blends frequently become soft and cheesy and lose most of their mechanical properties. When these laminates are bonded to the surface of a metal fastener, the desirable moisture resistance, mechanical properties, and protective capabilities of nylon are obtained and with a uniform and highly satisfactory bond strength.

As used herein, the term nylon shall be construed as referring to synthetic polyamides formed by copolymerization of primary and secondary diamines and dibasic acids. For purposes of this invention, we are only concerned with the linear thermoplastic nylons that can be used in injection molding or extrusion molding operations for example, the nylon resins sold by E. I. du Pont de Nemours & Co., under the ZYTEL trademark are well suited for the practice of this invention.

As used herein, the term "epoxy resin" will refer to the thermosetting resins which have epoxy or ethoxyline groups that serve as terminal linear polymerization points and particularly the various homologs of the diglycidyl ether of bisphenol A. The epoxy resin sold by Shell Chemical Co., under the trademark EPON 828 is well suited for the practice of this invention—this epoxy is the reaction product of epichlorhydrin and bisphenol A. It is liquid at room temperature, has an epoxide equivalent of 175–210, an average molecular weight of 350–400 and a viscosity of 5,000–15,000 centipoises at 25° C.

In a preferred embodiment of the invention an adhesive film of the nylon-epoxy blend about ½ to 5 mil in thickness is bonded to a sheet, strip or other surface of a nylon that is not appreciably soluble in common organic solvents, especially the lower aliphatic alcohols. Adhesive films of nylon-epoxy blends that are suitable for use in the present invention are commercially available (for example, FM–1000 Adhesive Film, Bloomingdale Rubber Co., Aberdeen, Md.; AF–41 Film Adhesive, Minnesota Mining and Manufacturing Co., St. Paul, Minn.; and EPON Adhesive 951, Shell Chemical Co., New York, N.Y.). Further such films can be made by blending an alcohol or organic solvent soluble nylon and the uncured epoxy in a solvent mixture such as methanol and trichlorethylene and casting a film of desired thickness therefrom. In such cases, it is preferred that the nylon comprise about 50 to 90% of the weight of the blend and optimum performance is obtained when the nylon comprises about 60–80% nylon. If the nylon is less than 50%, the epoxy will start to bloom and the film will be tacky, handling will be difficult and the film is more expensive; if the nylon is more than about 90%, the adhesive qualities of the film will be significantly reduced.

To form the laminate, the surface of the non-solvent soluble nylon that is to be bonded to the layer or film of the nylon-epoxy blend can be tackified by applying thereto a thin coating of an organic solvent solution that contains an elastomeric tackifier (for example, BR–1009–49 Tack Primer sold by Bloomingdale Rubber Company, Aberdeen, Md.) allowing the nylon base to stand until quite tacky, and then superimposing the blended nylon-epoxy film on the tackified nylon surface and immobilizing the layers, generally by holding the preform under light pressure for a sufficient time to cause the fusing of the blended layer to the nylon layer by crosslinking of the polymeric components through the tackified interface. Usually, 10 to 20 minutes at room temperature using only a few pounds will suffice to complete the laminate.

These laminates can be directly bonded and without surface preparation to the threads of a fastener element to which nylon per se is incapable of being bonded with satisfactory bond strength. This is especially true in connection with stainless steel, cadmium plated and oxide coated threaded fastener elements.

Under this aspect of the invention, the fastener need only be dry, clean and free of any loose scale and grease at the time the locking element is applied. For purposes of forming thread locking elements, the preferred laminate is one in which the nylon-epoxy adhesive film has a thickness of from about ½ to 5 mil and usually about 1–3 mil thickness. Film less than about ½ mil in thickness will not give satisfactory bond strength and films greater than about 5 mil thickness will create edge effects at the interface that will be deleteriously affected by moisture.

For small size bolts (e.g., ¼" bolts) the overall thickness of the laminate should be about 15 mil in order to provide the requisite torque characteristics. The overall thickness, however, will vary somewhat with the size of the fastener and the class of thread.

In applying the locking element to the threads in accordance with this invention, the laminate should be positioned so that the free face of the epoxy-nylon blend is in contact with the threaded substrate and the thicker nylon layer projecting away from the fastener surface and fully covering the adhesive film layer. The laminate is then heated to a temperature somewhat above the melting point of the nylon and is pressed into close contact with the threaded surface. Best results are obtained and edge effects are minimized if the fastener element is preheated to a temperature slightly above the melting point of the nylon and uncured epoxy blend (e.g. about 375–400° F. for most adhesive films) before the laminate is positioned thereon, and where the laminate is pressed against the threads by an element having a surface that is heated to a temperature slightly above the melting point of the nylon in the nylon layer (e.g., about 400–425° F. for most of the nylons). After the laminate has been flowed into intimate contact with the surface of the substrate, the preformed assembly is maintained at a temperature that will cure the nylon-epoxy blend and fuse it to the substrate. In this connection, the temperature should not be sufficiently great as to cause the locking element to slump and become deformed. Generally speaking, the curing is effected by subjecting the preform to an elevated temperature of about 250° F. for aobut 12 to 24 hours. However, it is also possible to obtain satisfactory cures by heating for 1 hour at 350° F. or even shorter times at higher temperatures. During the cure there is no necessity of having pressure continuously applied to the preformed assembly.

Further, in this connection, it should be noted that if the temperature of the substrate is too high, there is a danger that the adhesive film will melt too quickly and flow out from under the protective nylon layer and lose the benefits obtained when the cured nylon-epoxy layer is fully covered by the water resistant protective nylon layer.

Curing the epoxy-nylon film in the presence of a catalyst tends to lower the moisture sensitivity of the cured blend therefore, it is often desirable to incorporate in the blended nylon-epoxy layer a latent curing agent for the epoxy resin, i.e., a curing agent that is catalytically inactive at temperatures that normally would be encountered during storage of the laminate and which becomes activated at temperatures above about 145° F. and below the melting point of the nylon. Thus for example curing agents such as dicyandiamide can be incorporated in the epoxy-nylon blend by dispersing the curing agent in the solvent solution from which the adhesive film is cast. Because of the presence of nylon in the blend, the quantity of catalyst is not as critical a factor as it is in the curing of unblended epoxy resins; satisfactory results are obtained when the catalyst is used in quantities that are less than stoichiometric ratios. (Excessive quantities of the catalyst are objectionable as they increase the water sensitivity of the cured blend.) In most cases we have used about 4 parts by weight dicyandiamide per 100 parts of epoxy in the blend. The presence of the latent catalyst in the laminate will not cause it to cure prematurely during normal storage.

The following example will serve to illustrate the making of a laminate and the application thereof as a thread lock element all in accordance with this invention.

A sheet of nylon (ZYTEL 31) about 12–13 mil in thickness was bonded to an adhesive film made as follows: a 10% resin solids solution of an alcohol soluble nylon (ZYTEL 61) was prepared by dissolving the ZYTEL 61 in a 50/50 mixture of methanol and trichlorethylene. To this solution, there was added sufficient uncured epoxy resin (EPON 828) to provide a resin solution in which nylon/epoxy weight ratio was 75/25. To this solution there was added with sufficient agitation to prevent agglomeration, a quantity of finely divided dicyandiamide to provide 4 parts of the catalyst per 100 parts of epoxy resin. A film was cast from the solution onto a chrome plated steel plate heated from below with hot water to a temperature of about 180° F. and heated from above with hot (about 180° F.) air so as to drive off the solvent without blistering the film. The liquid on the plate was spread to give the desired film thickness of about 1 to 3 mil and allowed to dry for 20 minutes. At the end of the drying period, the white opaque solvent free film was peeled from the plate.

One surface of the ZYTEL 31 sheet was brush coated with a thin film of an elastomeric tackifier dissolved in an organic solvent (BR–1009–49 Tack Primer). The sheet was allowed to air dry and at the end of 3–4 minutes the surface was quite tacky. The cast epoxy-nylon film was superimposed on the tackified surface and the preformed assembly was passed through the nip of a calender thereby forming the laminate.

Laminates were also formed by an identical process except that the latent catalyst (dicyandiamide) was omitted from the cast adhesive film.

Laminates were also bonded to a metal substrate by applying heat and pressure to a sandwich composed of the nylon sheet and the metal substrate having the cast epoxy-nylon film therebetween and without employment of the applied thin film of the elastomeric tackifier.

Comparative bond strength measurements were made on lap shear speciments using a test procedure based on ASTM Method D1002–53T. Flat plates, 4" x 0.5", were overlapped with a plastic material between to form an adhesive joint. The test samples were prepared using a mold cavity 7.5" x 0.5", which provided an overlap of 0.5". A pressure of 5 p.s.i. was maintained on the sample by means of a standard weight placed on top of the joint. The entire assembly was placed in a furnace at 400° F. for about 5 minutes and then held at 350° F. for about 30 minutes, to either cure the adhesive or (where nylon alone was used in forming the bond) to promote bonding through the hot melt process. These tests show that the laminated plastic of this invention gave shear bonds on cadmium plated and oxide coated substrates of the order of 3,000 to 5,000 p.s.i. whereas ZYTEL 31 nylon alone gave shear bonds of the order of about 1,000 p.s.i.

We claim:
1. A method for providing a metal fastener with a locking element made of an engineering thermoplastic, which method comprises preparing a laminate having a first layer of said engineering thermoplastic and a second layer of a structural adhesive comprising an uncured blend of a thermosetting resin and a thermoplastic resin for cross-linking said thermosetting resin during curing; dimensioning the laminate to the size and shape of the locking element to be applied to the fastener; placing the laminate, with its dehesive layer in contact with the metal surface, in the desired position on the fastener; heating the laminate to a temperature above the melting point of the engineering thermoplastic layer and applying pressure to cause the laminate to flow into intimate contact with the metal surface; and then maintaining the flowed laminate at a temperature below the melting point of the engineering thermoplastic for a time sufficient to cure the adhesive layer thereof.

3. A method as in claim 1 wherein said metal fastener is oxide coated.

4. A method as in claim 1 wherein said metal fastener is cadmium plated.

5. A method as in claim 1 wherein said metal fastener is of stainless steel.

6. A method as in claim 1 wherein said engineering thermoplastic is solvent-insoluble nylon and said structural adhesive is a blend of solvent-soluble nylon and uncured epoxy resin.

7. A method as in claim 6 wherein said structural adhesive additionally comprises a thermally-activated latent curing agent for the epoxy resin.

8. A method as in claim 6 wherein said solvent-soluble nylon comprises from about 50 to 90 percent by weight of said structural adhesive blend.

9. A method as in claim 1 wherein the metal surface of said fastener is preheated to a temperature above the melting point of the adhesive layer of the laminate before the laminate is positioned thereon.

10. A method as in claim 9 wherein heat and pressure are applied to the laminate, after positioning on the metal surface of the fastener, by a tool heated to a temperature above the melting point of the engineering thermoplastic layer of the laminate.

References Cited
UNITED STATES PATENTS

| | | | |
|---|---|---|---|
| 3,093,177 | 6/1963 | Villo | 151—7 |
| 2,962,468 | 11/1960 | Groves | 161—186 X |
| 3,449,280 | 6/1969 | Frigstad | 161—186 X |
| 2,920,990 | 1/1960 | Been et al. | 161—186 X |
| 3,042,545 | 7/1962 | Kienle et al. | 117—75 |
| 3,371,008 | 2/1968 | Lopez | 161—186 |
| 3,462,337 | 8/1969 | Gorton | 161—227 X |
| 3,479,204 | 11/1969 | Lovelock et al. | 161—186 X |
| 3,539,443 | 11/1970 | Jackson | 161—186 |

HAROLD ANSHER, Primary Examiner

U.S. Cl. X.R.

156—309, 321, 322, 330, 331; 161—186, 214